3,816,530
NOVEL CHEMICAL COMPOUNDS AND
PROCESSES FOR PREPARING SAME
Bruce O. Linn, Somerville, N.J., assignor to
Merck & Co., Inc., Rahway, N.J.
No Drawing. Filed Nov. 19, 1971, Ser. No. 200,584
Int. Cl. C07c 129/08
U.S. Cl. 260—564 F      6 Claims

ABSTRACT OF THE DISCLOSURE

Novel nuclearly substituted 1-(cinnamylidene-amino)-3-benzylideneamino-guanidines and their acid addition salts are useful in the prevention and control of poultry coccidiosis. The compounds may be prepared by the reaction of a 1-amino-3-(substituted benzylideneamino)-guanidine with a substituted cinnamaldehyde or alkyl styryl ketone, or, alternatively, by reaction of a 3-amino-1-(substituted - cinnamylideneamino) - guanidine with a nuclearly substituted benzylaldehyde or alkyl phenyl ketone. As coccidostats, the products are formulated into poultry feed pre-mixes, finished poultry feeds and aqueous formulations for drinking water.

SUMMARY OF THE INVENTION

It is one object of this invention to provide novel unsymmetrically substituted guanidines. A more specific object is provision of novel 1-cinnamylideneamino-3-benzylideneamino-guanidines, and their acid addition salts. More specifically it is an object to provide novel compounds having the structural formula:

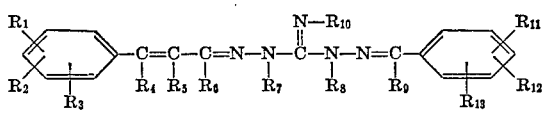

and acid addition salts thereof, where $R_1$ and $R_{11}$ are each hydrogen, halo, nitro, trifluoromethyl, trifluoromethoxy, trifluoromethylthio, acetyl, carbamoyl, cyano, methylsulfinyl, methylsulfonyl, carbomethoxy or dimethylaminosulfonyl; $R_2$ and $R_{12}$ are each hydrogen, halogen or nitro; $R_3$ and $R_{13}$ are each hydrogen or halogen. At least one of $R_1$, $R_2$, $R_3$, $R_{11}$, $R_{12}$, and $R_{13}$ is a substituent other than hydrogen. In the above formula $R_4$ and $R_5$ are each hydrogen, halogen or lower alkyl; $R_6$, $R_7$, $R_8$, and $R_9$, are each hydrogen or lower alkyl; and $R_{10}$ is hydrogen, lower alkyl or lower alkanoyl. In the above definitions halogen includes chloro, bromo, fluoro or iodo, lower alkyl includes alkyl of 1–5 carbons such as methyl, ethyl, isopropyl or pentyl, and lower alkanoyl also includes 1–5 carbons such as acetyl, propionyl, butyryl and the like. These compounds have significant anticoccidial activity and are thus of value in the treatment and prevention of this parasitic disease in poultry. An additional object of the invention, therefore, is the provision of poultry feeds and poultry feed supplements containing a compound of Formula I as an active anticoccidial ingredient. In referring throughout to Formula I, it is intended to include non-toxic acid addition salts as well as the free bases. A still further object of the invention is provision of methods for making these compounds, one preferred method being the processing which an appropriate 3-amino - 1 - cinnamylideneamino- (or benzylideneamino)-guanidine is condensed with an appropriate benzylaldehyde (or cinnamaldehyde), it being understood that when the guanidine is substituted with a cinnamylideneamino moiety the other reactant is the appropirate benzaldehyde, and conversely when the guanidine is substituted with a benzylideneamino moiety, the other reactant is the appropriate cinnamaldehyde. Appropriate alkyl phenyl or alkylstyryl ketones are used as reactants instead of the aldehydes when $R_6$ and/or $R_9$ are lower alkyl. Other processes for making the compounds of this invention are also provided, and these are described in detail hereinafter. Other objects and provisions of the invention will become evident from the ensuing description.

DETAILED DESCRIPTION OF THE INVENTION

Coccidiosis is a widespread poultry disease involving the invasion of caecal and intestinal mucosa by coccidia, specifically protozoan parasites of the genus Eimeria. The most important of these species are *E. maxima*, *E. ascervulina*, *E. tenella*, *E. necatrix*, *E. brunetti*, *E. praecox* and *E. mitis*. When left untreated, the severe forms of the disease leads to poor weight gain, reduced feed efficiency, reduced egg production and high mortality. For these reasons, the control of coccidiosis is highly important to the poultry industry. Although it was known that a limited group of symmetrically substituted guanidines had anticoccidial activity, (Belgian Pat. No. 735,375) it was not known heretofore that any unsymmetrically substituted guanidines would be valuable coccidiostats.

According to the present invention it has now been found that the unsymmetrically substituted guanidines of Formula I above have a significant degree of activity againnst coccidiosis, particularly againsnt poultry coccidiosis. Of the novel compounds represented by Formula I there are preferred those wherein $R_1$ and $R_{11}$ represent hydrogen, halogen, nitro, trifluoromethyl, trifluoromethoxy, trifluoromethylthio, cyano, methylsulfinyl, methylsulfonyl or carbomethoxy, at least one being other than hydrogen; $R_4$ and $R_5$ are hydrogen, halo or methyl; and $R_{10}$ is hydrogen, methyl or acetyl. Also preferred are those compounds wherein the substituents other than hydrogen in the aromatic rings are in the meta and/or para positions.

More preferred embodiments of the product aspect of the invention are wherein $R_1$ and $R_{11}$ are halogen (especially chloro or bromo), nitro, trifluoromethyl, cyano or methylsulfinyl, where $R_2$, $R_3$, $R_{12}$, and $R_{13}$ are hydrogen, where $R_4$ and $R_5$ are hydrogen or chloro (especially hydrogen), where $R_6$ and $R_9$ are hydrogen or methyl, $R_7$ and $R_8$ are hydrogen, and where $R_{10}$ is hydrogen.

It will be appreciated by those skilled in this art that the unsymmetrically substituted guanidines described above form acid addition salts and indeed it is preferred to synthesize and use these compounds in the form of each salts. The particular salt is not critical although it should be one that is non-toxic for poultry at the dose levels used for these coccidiostats. Among the preferred salts are the mineral acid addition salts such as the hydrochloride, hydrobromide, nitrate, sulfate, phosphate, and the like. Salts with organic acids may be utilized, and typical samples of these are the citrates, acetate, naphthoate, benzoate and the like. Any particular salt is conveniently obtained by contacting the free base in solution with the appropriate acid.

The compounds of this invention may be prepared by reacting together an appropriately substituted amino guanidine and an appropriately substituted aldehyde or ketone.

As will be clear to those skilled in this art, a 3-amino-1-cinnamylidene-amino guanidine will be reacted with an appropriate benzaldehyde or alkylphenyl ketone, whereas a 1-amino-3-benzylideneamino-guanidine will be reacted with an appropriate cinnamaldehyde or alkylstyryl ketone. This process may be pictured structurally as follows:

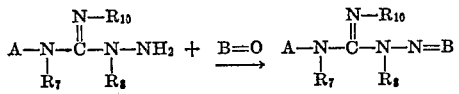

where A represents

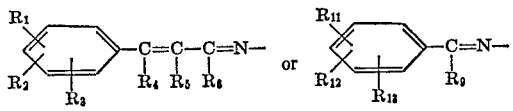

and B represents

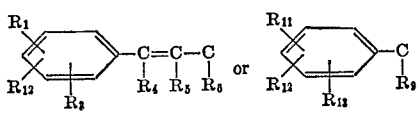

It will be understood that one of the reactants will contain the cinnamylidene moiety, and the other the benzylidene moiety, this, of course, being necessary in order to obtain the unsymmetrically substituted guanidine. The R symbols are as previously defined. When $R_6$ and/or $R_9$ are lower alkyl, the reactant B will, of course, be a ketone instead of an aldehyde.

It is generally preferred to carry out this process in a loweralkanolic or aqueous loweralkanoic solvent as for example methanol, ethanol or isopropanol, or such alcohols containing a minor amount of water. These solvents are not, however, critical, the important requirement being that the reactants are soluble in the reaction medium. A solvent such as benzene or toluene could be employed if desired. The reaction requires equimolar amounts of the two reactants although in practice it is preferable to use a slight excess, i.e., 1–10%, of the aldehyde or ketone reactant. The temperature is not critical and the reaction proceeds satisfactorily at room temperature or elevated temperature. For convenience, it is frequently preferred to carry out the condensation at the reflux temperature of the solvent. In most cases, the desired reaction product precipitates or crystallizes readily from the reaction mixture but in any event it may be recovered using techniques known to those skilled in the art.

The following are representative examples of compounds within the scope of this invention, which compounds are prepared by the procedure of Example 1 below using as reactants 11 millimoles of the appropriate nuclearly substituted cinnamaldehyde and 10 millimoles of the appropriate 1-amino-3-(nuclearly-substituted benzylidene-amino)-guanidine hydrochloride. The nuclear substituents are not affected or changed during the reaction, and in each case the procedure of Example 1 affords the respective hydrochloride salt.

1-(4-chlorocinnamylideneamino)-3-(3,4,5-trichlorobenzylideneamino)-guanidine,
1-(3,4,5-trichlorocinnamylideneamino)-3-(3,4-dichlorobenzylideneamino)-guanidine,
1-(3,4,5-trichlorocinnamylideneamino)-3-(3,4,5-trichlorobenzylideneamino)-guanidine,
1-(α-chloro-β-methylcinnamylideneamino)-3-(4-chlorobenzylideneamino)-guanidine [from β-chloro-α-methylcinnamaldehyde and 1-amino-3-(4-chlorobenzylideneamino)-guanidine hydrochloride],
1-(4-chlorocinnamylideneamino)-3-(4-acetylbenzylideneamino)-guanidine,
1-(4-chlorocinnamylideneamino)-3-(4-bromobenzylideneamino)-guanidine,
1-(4-chlorocinnamylideneamino)-3-(4-carbamoylbenzylideneamino)-guanidine,
1-(4-chlorocinnamylideneamino)-3-(4-cyanobenzylideneamino)-guanidine,
1-(4-chlorocinnamylideneamino)-3-(4-carbomethoxybenzylideneamino)-guanidine,
1-(4-chlorocinnamylideneamino)-3-(4-dimethylaminosulfonylbenzylideneamino)-guanidine,
1-(4-chlorocinnamylideneamino)-3-(4-fluorobenzylideneamino)-guanidine,
1-(4-chlorocinnamylideneamino)-3-(4-methylsulfinylbenzylideneamino)-guanidine,
1-(4-chlorocinnamylideneamino)-3-(4-methylsulfonylbenzylideneamino)-guanidine,
1-(4-chlorocinnamylideneamino)-3-(4-trifluoromethoxybenzylideneamino)-guanidine,
1-(4-chlorocinnamylideneamino)-3-(4-trifluoromethylbenzylideneamino)-guanidine,
1-(4-chlorocinnamylideneamino)-3-(4-trifluoromethylthiobenzylideneamino)-guanidine,
1-(4-acetylcinnamylideneamino)-3-(4-chlorobenzylideneamino)-guanidine,
1-(4-bromocinnamylideneamino)-3-(4-chlorobenzylideneamino)-guanidine,
1-(4-carbamylcinnamylideneamino)-3-(4-chlorobenzylideneamino)-guanidine,
1-(4-cyanocinnamylideneamino)-3-(4-chlorobenzylideneamino)-guanidine,
1-(4-carbomethoxycinnamylideneamino)-3-(4-chlorobenzylideneamino)-guanidine,
1-(4-dimethylaminosulfonylcinnamylideneamino)-3-(4-chlorobenzylideneamino)-guanidine,
1-(4-iodocinnamylideneamino)-3-(4-chlorobenzylideneamino)-guanidine,
1-(4-methylsulfinylcinnamylideneamino)-3-(4-chlorobenzylideneamino)-guanidine,
1-(4-methylsulfonylcinnamylideneamino)-3-(4-chlorobenzylideneamino)-guanidine,
1-(4-trifluoromethoxycinnamylideneamino)-3-(4-chlorobenzylideneamino)-guanidine,
1-(4-trifluoromethylthiocinnamylideneamino)-3-(4-chlorobenzylideneamino)-guanidine,
1-(4-trifluoromethylcinnamylideneamino)-3-(4-chlorobenzylideneamino)-guanidine,
1-(4-acetylcinnamylideneamino)-3-(4-acetylbenzylideneamino)-guanidine,
1-(4-bromocinnamylideneamino)-3-(4-bromobenzylideneamino)-guanidine,
1-(4-carbamoylcinnamylideneamino)-3-(4-carbamoylbenzylideneamino)-guanidine,
1-(4-cyanocinnamylideneamino)-3-(4-cyanobenzylideneamino)-guanidine
1-(4-carbomethoxycinnamylideneamino)-3-(4-carbomethoxybenzylideneamino)-guanidine,
1-(4-dimethylaminosulfonylcinnamylideneamino)-3-(4-dimethylaminosulfonylbenzylideneamino)-guanidine,
1-(4-iodocinnamylideneamino)-3-(4-fluorobenzylideneamino)-guanidine,
1-(4-methylsulfinylcinnamylideneamino)-3-(4-methylsulfinylbenzylideneamino)-guanidine,
1-(4-methylsulfonylcinnamylideneamino)-3-(4-methylsulfonylbenzylideneamino)-guanidine,
1-(4-nitrocinnamylideneamino)-3-(4-nitrobenzylideneamino)-guanidine,
1-(4-trifluoromethoxycinnamylideneamino)-3-(4-trifluoromethoxybenzylideneamino)-guanidine,
1-(4-trifluoromethylthiocinnamylideneamino)-3-(4-trifluoromethylbenzylideneamino)-guanidine,
1-(4-trifluoromethylcinnamylideneamino)-3-(4-chlorobenzylideneamino)-guanidine,
1-(3-cyanocinnamylideneamino)-3-(4-acetylbenzylideneamino)-guanidine,
1-(3-nitrocinnamylideneamino)-3-(4-carbomethoxybenzylideneamino)-guanidine,
1-(3,4-dichlorocinnamylideneamino)-3-(3-nitrobenzylideneamino)-guanidine, 1-(3,4-dichlorocinnamylideneamino)-3-(4-methylsulfonylbenzylideneamino)-guanidine,
1-(3-trifluoromethylcinnamylideneamino)-3-(4-bromobenzylideneamino)-guanidine, and
1-(3-chloro-4-acetylcinnamylideneamino)-3-(3-nitro-4-fluorobenzylideneamino)-guanidine.

In a similar fashion following the method and quantities of Example 1 herein, 1-(4-chlorocinnamylideneamino)-3-(4 - chlorobenzylideneamino)-1,3 - dimethyl-guanidine hydrochloride is obtained from 1-amino-3-(4-chlorobenzylideneamino)-1,3-dimethyl-guanidine hydrochloride and 4-chlorocinnamaldehyde; 1-(4-chloro-α-methylcinnamylideneamino)-3-(4-chloro - α-methylbenzylideneamino)-guanidine hydrochloride is produced from 1-amino-3-(4-chloro-α - methylbenzylideneamino)-guanidine hydrochloride and methyl p-chlorostyryl ketone; 1-(4-chloro-α - isopropylcinnamylideneamino)-3-(4-chloro-α - isopropylbenzylideneamino)-guanidine hydrochloride is obtained from 1-amino-3-(4-chloro-α-isopropylbenzylideneamino)-guanidine hydrochloride and isopropyl p-chlorostyryl ketone.

In accordance with an additional aspect of this invention, there is provided a process that is particularly useful for making the compounds of Formula I above where $R_7$ and/or $R_8$ are lower alkyl, and $R_{10}$ is hydrogen. This process may be depicted structurally as follows:

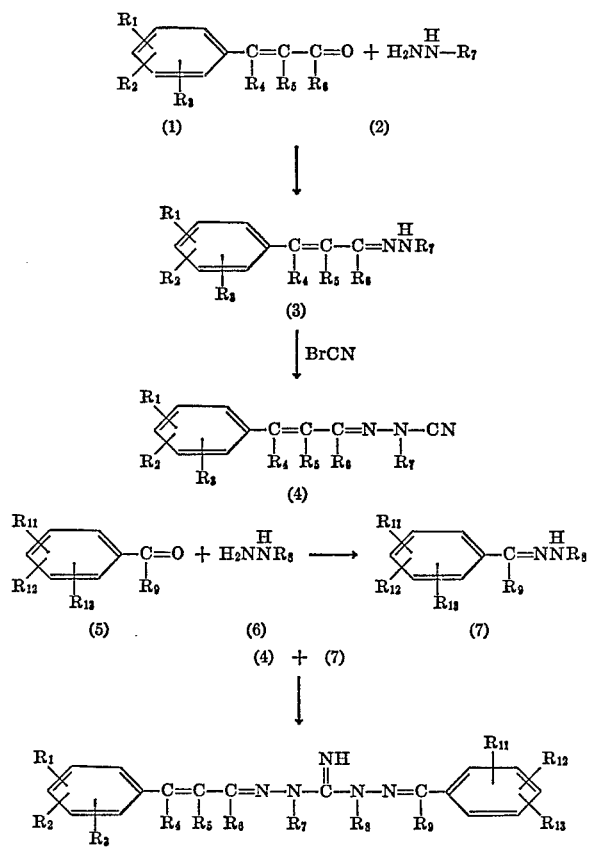

In the above flow-diagram, the R symbols are as in Formula I, with $R_7$ and/or $R_8$ preferably being lower alkyl.

The aldehyde or ketone (1) is reacted with the hydrazine or alkylhydrazine (2), preferably in a lower alkanol at elevated temperature, to produce the hydrazone or alkylhydrazone (3). On reaction with a slight molar excess of cyanogen bromide in the presence of a weak base such as an alkali metal bicarbonate, this latter compound affords the corresponding cyanamide (4). The cyanamide is then reacted together with the appropriate benzaldehyde hydrazone or alkylhydrazone (7), preferably in a lower alkanol at elevated temperature, to afford the desired substituted guanidine of this invention (II). Although not so limited, it will be clear that this synthesis is especially useful to make those substituted guanidines of the invention wherein $R_7$ and/or $R_8$ are lower alkyl such as methyl, ethyl or propyl.

An additional process embodiment of the invention particularly useful for making the compounds of Formula I where $R_{10}$ is lower alkyl and $R_7$ and $R_8$ are hydrogen is represented by the following flow-diagram:

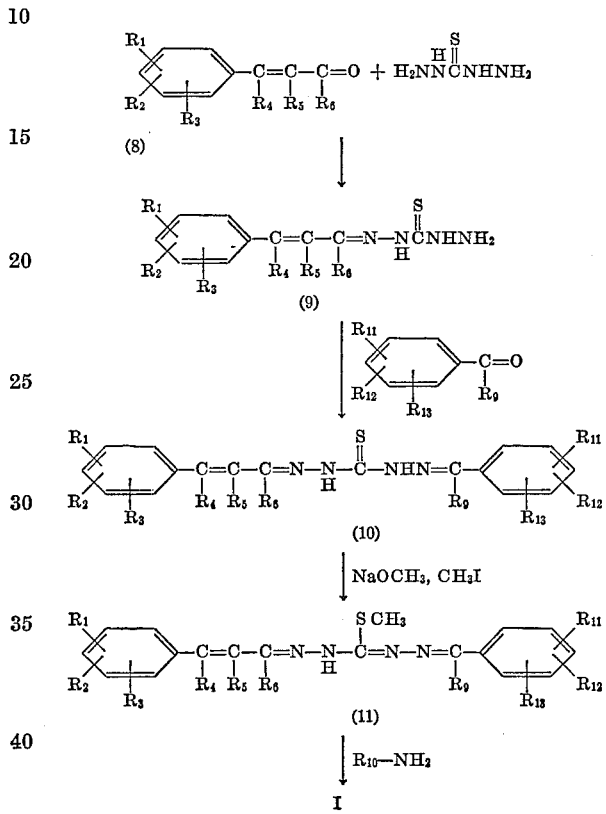

In the above, $R_{10}$ is lower alkyl, $R_7$ and $R_8$ are hydrogen, and the remaining R symbols are as previously defined.

In accordance with the above process the nuclearly substituted cinnamaldehyde or alkyl phenylvinyl ketone (8) is treated with an essentially equimolar amount of thiocarbohydrazide at elevated temperatures in a suitable solvent medium, preferably a lower alkanol. The resulting thiocarbohydrazone (9) is reacted with an appropriately substituted benzaldehyde or alkylphenyl ketone, preferably in a lower alkanol at elevated temperature, to produce the unsymmetrically disubstituted thiocarbohydrazone (10). This latter material is S-methylated with methyl iodide in the presence of an alkali metal methoxide to produce the compound of Structure (11) above. The S-methyl compound is reacted with a loweralkyl amine, such as methylamine, ethylamine or isopropylamine at elevated temperature under a slight superatmospheric pressure whereby the methylthio radical of (11) is displaced and the 2-loweralkyl guanidine of Formula I ($R_{10}$=loweralkyl) is produced.

When it is desired to prepare a compound of Formula I where $R_{10}$ is loweralkanoyl, the corresponding compound where $R_{10}$ is hydrogen is reacted with an acylating agent, and preferably with a loweralkanoic acid anhydride such as acetic or propionic acid anhydride. The reaction is normally carried out at elevated temperature in the presence of a tertiary amine.

Coccidiosis is a widespread poultry disease involving the invasion of caecal and intestinal mucosa by coccidia, specifically protozoan parasites of the genus *Eimeria*. The most important of these species are *E. maxima*, *E.*

*acervulina, E. tenella, E. necatrix, E. brunetti, E. praecox* and *E. mitis*. Related species of coccidia such as *E. meleagridis* and *E. adenoides* cause coccidiosis in turkeys. When left untreated, the severe forms of the disease leads to poor weight gain, reduced feed efficiency, reduced egg production and high mortality. For these reasons, the effective control of coccidiosis is highly important to the poultry industry.

As previously stated, the unsymmetrically substituted diaminoguanidines of Formula I above, and the acid addition salts thereof, are highly effective for the treatment and prevention of coccidiosis.

In using the compounds of this invention in the treatment and prevention of coccidiosis, they are conveniently fed to poultry as a component of the feed of the animals although they may also be given dissolved or suspended in the drinking water. According to one aspect of the invention, novel compositions are provided in which the novel compounds described herein are present as an active anticoccidial ingredient. Such compositions comprise such compound(s) intimately dispersed or admixed with an inert carrier or diluent. By an inert carrier is meant one that is nonreactive with respect to the drug and that may be administered with safety to the animals. The carrier or diluent is preferably one that is or may be an ingredient of the animal feed and is usually itself a nutritive element of poultry sustenance.

The compositions which are a preferred feature of this aspect of the invention are the so-called feed supplements in which the active ingredient is present in relatively large amounts and which are suitable for addition to the poultry feed either directly or after an intermediate dilution or blending step. Examples of carriers or diluents suitable for such compositions are solid, orally ingestable, nutritive carriers such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone and the like. The guanidine derivative is intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 2% to about 40% by weight, and preferably from about 5–30% by weight of active ingredient are particularly suitable for addition to poultry feeds, and compositions containing from about 10–25% by weight of guanidine compounds are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of these coccidiostats in a feed supplement is partly a function of the level of active ingredient desired in the finished feed.

Examples of typical feed supplements containing a compound of this invention dispersed in a solid carrier are:

(A)

|  | Lbs. |
|---|---|
| 1 - (4 - chlorocinnamylideneamino) - 3 - (4 - chlorobenzylideneamino-guanidine hydrochloride | 25.0 |
| Wheat shorts | 75.0 |

(B)

| 1 - (4 - chlorocinnamylideneamino) - 3 - (3,4-dichlorobenzylideneamino)-guanidine hydrochloride | 10.0 |
|---|---|
| Soya grits | 90.0 |

(C)

| 1 (4 - chlorocinnamylideneamino) - 3 - (4 - nitrobenzylideneamino)-guanidine hydrochloride | 15.0 |
|---|---|
| Corn distillers' dried grains | 85.0 |

(D)

| 1 - (4 - chlorocinnamylideneamino) - 3 - (4-chlorobenzylideneamino)-guanidine hydrochloride | 15.0 |
|---|---|
| Amprolium | 20.0 |
| Wheat standard middlings | 65.0 |

These and similar feed supplements are prepared by uniformly mixing the guanidine with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of 1-(cinnamylideneamino)-3-(benzylideneamino)-guanidine of Formula I required for effective control of coccidiosis will depend upon factors such as the specific compound employed, the type and severity of infection, and duration of treatment. In any event, only a minor amount is necessary in relation to the total feed or drinking water consumption. Good prophylactic results are achieved when the feed administered to poultry contains from about 0.003% to about 0.05% by weight of guanidine compound, and preferably from about 0.01% to about 0.025% by weight. For therapeutic use, higher levels of up to 0.1% by weight of feed may be used effectively for short periods of time.

Administration via the drinking water of the birds is often employed in the therapeutic use of the compounds since poultry with coccidiosis are apt to consume less solid feed than normal birds. The compounds may be added directly to the drinking water. Alternatively, water-soluble acid addition salts may be used, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from 1–25% by weight of active compound are suitable.

According to an additional aspect of this invention, there are provided anticoccidial compositions containing a guanidine of Formula I above together with a second coccidiostat such as amprolium, zoalene, nicarbazin, ethopabate and the like. The nature of the second coccidiostat is not critical, and its presence frequently permits using lower feed levels of guanidine compound than would otherwise be required. The feed compositions may also contain other substances useful for poultry well-being such as vitamins, antibiotics, growth promotants or antiviral agents.

EXAMPLE 1

2.48 g. of 1-amino-3-(4-chlorobenzylideneamino)-guanidine hydrochloride and 1.83 g. of p-chlorocinnamaldehyde are stirred together in 100 ml. of reagent methanol at the reflux temperature under nitrogen for 90 minutes. At the end of this time the mixture is cooled in an ice bath with stirring, and then diluted with an equal volume of ethyl ether. The resulting solid product is collected by filtration, rinsed with cold methanol-ether (1:2), and then with ethyl ether. The resulting solid is dried to afford 1 - (4 - chlorocinnamylideneamino) - 3 - (4 - chlorobenzylideneamino)-guanidine hydrochloride M.P. 245° C.

EXAMPLE 2

0.5 g. of 1-amino-3-(4-chlorobenzylideneamino)-guanidine hydrochloride and 0.263 ml. of cinnamaldehyde are stirred in 10 ml. of dry methanol at the reflux temperature for 30 minutes. The mixture is then cooled in an ice bath. Crystals form and the mixture is diluted with about 1.5 volumes of ethyl ether. The solid product is collected, rinsed with ethyl ether and dried to afford crystals of 1-cinnamylideneamino - 3 - (4 - chlorobenzylideneamino)-guanidine hydrochloride, M.P. 235–236° C.

EXAMPLE 3

952 mg. of 3-amino-1-(4-chlorocinnamylideneamino)-guanidine is suspended in 200 ml. of methanol containing 10 ml. of water. The mixture is stirred at room temperature and to it is added 818 mg. of 4-chloro-3-nitro benzaldehyde. The resulting mixture is stirred at room temperature for 4 days. At the end of this time the solid product is separated by filtration, washed with methanol and dried at 60° C. for 3 hours to afford substantially pure 1-(4-chlorocinnamylideneamino) - 3 - (4 - chloro-3-nitrobenzylideneamino)guanidine, M.P. 230° C.

EXAMPLE 4

952 mg. of 3-amino-1-(4-chlorocinnamylideneamino)-guanidine is dissolved in 200 ml. of methanol and the solution filtered to remove a trace of insolubles. To the filtrate is added 10 ml. of water and 604 mg. of 4-nitrobenzaldehyde. The mixture is stirred at room temperature for 2 days and at the end of this time the solid product is filtered and washed with cold methanol. It is dried at 65° C. for 2 hours to afford 1-(4-chlorocinnamylideneamino)-4-(nitrobenzylideneamino)-guanidine, M.P. 219–220° C.

EXAMPLE 5

952 mg. of 3-amino-1-(4-chlorocinnamylideneamino)-guanidine is dissolved in 200 ml. of methanol and the solution filtered to remove any solids. To this solution there is added 10 ml. of water and 700 mg. of 3,4-dichlorobenzaldehyde. The resulting reaction mixture is stirred at room temperature for 2 days and then concentrated at room temperature *in vacuo* until crystallization begins. It is then allowed to stand at room temperature for one hour and the solid product separated by filtration and washed with cold methanol to afford crystals of 1 - (4 - chlorocinnamylideneamino) - 3 - (3,4 - dichlorobenzylideneamino)-guanidine, M.P. 174–176° C.

EXAMPLE 6

2.38 g. of 3 - amino-1-(4-chlorocinnamylideneamino)-guanidine is dissolved in 375 ml. of methanol, and the solution filtered to remove a trace of insolubles. 25 ml. of water and 1.41 g. of 4-chlorobenzaldehyde are added to the methanol solution. The mixture is stirred at room temperature for 24 hours. At the end of this time the solid product is recovered by filtration, washed with cold methanol and air dried to afford substantially pure 1-(4-chlorocinnamylideneamino) - 3 - (4 - chlorobenzylideneamino)-guanidine, M.P. 209–211° C.

EXAMPLE 7

To a filtered solution of 2.48 mg. of 1-amino-3-(4-chlorobenzylideneamino)-guanidine hydrochloride in 10 ml. of methanol there is added a solution of 201 mg. of 3,4-dichlorocinnamaldehyde in 2 ml. of methanol. The resulting mixture is stirred at room temperature for 90 minutes at the end of which time a precipitate has formed. The solid product is recovered by filtration, washed consecutively with methanol and ether, and air dried, It consists of substantially pure 1-(3,4-dichlorocinnamylideneamino)-3-(4-chlorobenzylideneamino)-guanidine hydrochloride, M.P. 238–241° C.

EXAMPLE 8

To a stirred solution of 354 mg. of 4-nitrocinnamaldehyde in 25 ml. of methanol there is added a solution of 496 mg. of 1-amino-3-(4-chlorobenzylideneamino)-guanidine hydrochloride in 20 ml. of methanol. The mixture is stirred for 15 hours during which time the desired product crystallizes. The mixture is then cooled to about 10° C. and filtered. The solid is washed twice with methanol and twice with ether and then dried to afford 1-(4-nitrocinnamylideneamino) - 3 - (4-chlorobenzylideneamino)-guanidine hydrochloride, M.P. 228–232° C.

EXAMPLE 9

3.00 g. of 1-ethyl-1-(4-chlorocinnamylideneamino)-3-methyl-3-(4 - chlorobenzylideneamino)-guanidine hydrochloride in 50 ml. of pyridine and 10 ml. of acetic anhydried are heated on the steam bath for 60 minutes. The mixture is evaporated to dryness and the solid product is recrystallized from methanol and ethyl ether to afford 2-acetyl-1-ethyl-1-(4-chlorocinnamylideneamino)-3-methyl-3-(4 - chlorobenzylideneamino)-guanidine hydrochloride.

EXAMPLE 10

(a) 16.7 g. (0.10 mole) of 4-chlorocinnamaldehyde and 6.50 g. (0.11 mole) of ethylhydrazine in 150 ml. of absolute ethanol are refluxed for 3 hours. The solution is then cooled in ice and diluted with 50 ml. of water. The resulting solid product is collected by filtration, rinsed with cold ethanol-water (3:1) and dried to afford 4-chlorocinnamaldehyde ethylhydrazone.

The methyl hydrazone is obtained by replacing the ethyl hydrazine with 5.06 g. of methyl hydrazine.

(b) 14.1 g. (0.10 mole) of 4-chlorobenzaldehyde and 5.08 g. (0.11 mole) of methyl hydrazine in 150 ml. of absolute ethanol are refluxed for 3 hours. The solution is then cooled in ice and diluted with 50 ml. of water. The resulting solid is collected, rinsed with cold ethanol-water (3:1) and dried to give 4-chlorobenzaldehyde methylhydrazone. Concentrated hydrochloric acid is added dropwise to a cold solution of the hydrazone in ethanol until the pH is 3.0. The product is precipitated by addition of several volumes of ethyl ether and dried *in vacuo* to give 4-chloro-benzaldehyde methylhydrazone hydrochloride.

(c) 20.9 g. (0.10 mole) of 4-chlorocinnamaldehyde ethylhydrazone, 11.7 g. (0.11 mole) of cyanogen bromide, and 16.8 g. (0.20 mole) of sodium bicarbonate are stirred in 200 ml. of methanol at room temperature for 2 days. The mixture is concentrated to near dryness and then taken up in ethyl ether and water. The ether layer is extracted with water, with cold, very dilute hydrochloric acid, and then with sodium bicarbonate solution. The etheral solution is dired over magnesium sulfate and is evaporated to dryness to give N-(4-chlorocinamylideneamino)-N-ethylcyanamide.

When 19.4 g. of 4-chlorocinnamaldehyde methylhydrazone are used in this reaction, the corresponding N-methylcyanamide is obtained.

(d) 2.34 g. (10 mmole) of N-ethyl-N-(4-chlorocinnamylideneamino)-cyanamide, 2.05 g. (10 mmole) of 4-chlorobenzaldehyde methylhydrazone hydrochloride and 0.17 g. (1.0 mmole) of 4-chlorobenzaldehyde methylhydrazone free base are stirred at reflux in 80 ml. of t-butanol for 2 hours. The mixture is then evaporated to dryness *in vacuo*. The residue is recrystallized from methanol-ethyl ether furnishing 1-ethyl-1-(4-chlorocinnamylideneamino)-3-methyl-3-(4-chlorobenzylideneamino)guanidine hydrochloride.

1-methyl-1-(4-chlorocinnamylideneamino)-3-(4-chlorobenzylideneamino)-guanidine hydrochloride is obtained by carrying out this example using as starting materials 2.2 g. of N-(4 - chlorocinnamylideneamino)-N-methyl cyanamide, 1.91 g. of 4-chlorobenzaldehyde methylhydra-

EXAMPLE 11

(a) A hot solution of 11.3 g. (0.11 mole) of thiocarbohydrazide in 150 ml. of water-ethanol (2:1) is added with stirring to a hot solution of 16.7 g. (0.10 mole) of 4-chlorocinnamaldehyde, in 50 ml. of ethanol. The mixture is stirred at the reflux temperature for 60 minutes and then allowed to cool to about room temperature. The resulting crystals are collected and rinsed with cold ethanol-water (1:1) and then with cold ethanol. The product is dried to give 3-amino - 1 - (4 - chlorocinnamylideneamino)-thiourea.

(b) 25.5 g. (0.10 mole) of 3-amino-1-(4-chlorocinnamylideneamino)-thiourea and 14.1 g. (0.10 mole) of 4-chlorobenzaldehyde in 500 ml. of reagent methanol are stirred at reflux for 90 minutes and then cooled in an ice bath. The crystalline product is collected, rinsed with cold ethanol and dried in a vacuum oven to give 1-(4-chlorocinnamylideneamino) - 3 - (4-chlorobenzylidenamino)-thiourea.

(c) To a solution of 3.77 g. (10 mmole) of 1-(4-chlorocinnamylideneamino) - 3 - (4-chlorobenzylideneamino)-thiourea, in 100 ml. of dry methanol there is added with stirring .54 g. (10 mmole) of sodium methoxide. The mixture is stirred under nitrogen for 10 minutes and then 0.63 ml. (10 mmole) of methyl iodide is added. The resulting mixture is stirred at reflux for 90 minutes and then cooled in an ice bath. 25 ml. of water is added. The precipitate which forms is collected, rinsed with cold methanol-water (3:1) and dried to afford S-methyl 1-(4-chlorocinnamylideneamino) - 3 - (4-chlorobenzylideneamino)-thiourea.

Concentrated hydrochloric acid is added dropwise with stirring to a cold solution of 3.91 g. (10 mmole), of S-methyl-1-(4-chlorocinnamylideneamino) - 3 - (4-chlorobenzylideneamino)-thiourea, in 100 ml. of reagent methanol until the pH reaches 3.0. Several volumes of ethyl ether are added and the precipitated product is collected, rinsed with ethyl ether and dried to give S-methyl-1-(4-chlorocinnamylideneamino) - 3 - (4-chlorobenzylideneamino)-thiourea hydrochloride.

(d) 4.29 g. (10 mmole) of S-methyl 1-(4-chlorocinnamylideneamino) - 3 - (4-chlorobenzylideneamino)-thiourea hydrochloride in 100 ml. of dry methanol and 25 ml. of methylamine are shaken at 60° C. in a sealed glass container for 2 hours. The resulting solution is concentrated to dryness under reduced pressure and the solid residue is recrystallized from methanol-ethyl ether to give 2-methyl - 1 - (4-chlorocinnamylideneamino)-3-(4-chlorobenzylideneamino)-guanidine hydrochloride.

EXAMPLE 12

To a filtered solution of 496 mg. of 1-amino-3-(4-chlorobenzylideneamino)-guanidine hydrochloride in 20 ml. of methanol there is added a solution of 361 mg. of 4-chloro-β-methylcinnamaldehyde in about 5 ml. of methanol. A yellow solution forms and in a few minutes precipitation begins. The mixture is stirred overnight at room temperature and the resulting precipitate collected by filtration, washed with methanol and then with ether, and dried to afford 1-(4-chloro-γ-methylcinnamylideneamino)-3-(4-chlorobenzylideneamino)-guanidine hydrochloride monohydrate, M.P. 229–233° C.

EXAMPLE 13

A suspension of 450 mg. of 1-amino-3-(4-chloro-α-methylbenzylideneamino)-guanidine in 25 ml. of methanol is treated with 0.17 ml. of concentrated hydrochloric acid. The solid dissolves and the solution is clarified by filtration. To it is added 354 mg. of p-nitrocinnamaldehyde. In a short time a precipitate begins to form in the yellow solution. The mixture is stirred overnight at room temperature and the solid product separated by filtration. It is washed consecutively with methanol and ether, and then dried to give 1-(4-nitrocinnamylideneamino)-3-(4-chloro-α-methylbenzylideneamino)-guanidine hydrochloride monohydrate, M.P. 242–247° C.

EXAMPLE 14

To a solution of 450 mg. of 1-amino-3-(4-chloro-α-methylbenzylideneamino)-guanidine in 25 ml. of methanol containing 0.17 ml. of concentrated hydrochloric acid is added 400 mg. of 4-trifluoromethylcinnamaldehyde. The resulting reaction mixture is stirred for 15 hours at room temperature and the resulting precipitate recovered by filtration. The solid is washed with methanol and then with ether and air dried to give 1-(4-trifluoromethylcinnamylideneamino) - 3 - (4 - chloro-α-methylbenzylideneamino)-guanidine hydrochloride, M.P. 254–260° C.

EXAMPLE 15

361 mg. of α-methylcinnamaldehyde is added to a stirred solution of 1-amino-3-(4-chlorobenzylideneamino)-guanidine hydrochloride in 20 ml. of methanol. The resulting solution is stirred at room temperature for about 14 hours. It is then concentrated at room temperature at reduced pressure to about one-half volume, at which time a precipitate begins to form. The mixture is stirred for about 1 hour and the solid product separated by filtration, washed successively with methanol and ether, and air dried. It is 1-(4-chloro-β-methylcinnamylideneamino)-3-(4-chlorobenzylideneamino)-guanidine hydrochloride monohydrate, M.P. 237–241° C.

EXAMPLE 16

To a suspension of 450 mg. of 1-amino-3-(4-chloro-α-methylbenzylideneamino)-guanidine in 25 ml. of methanol there is added 0.17 ml. of concentrated hydrochloric acid. To the resulting solution is added 304 mg. of 4-cyanocinnamaldehyde. The reaction mixture is stirred at room temperature for 15 hours, and at the end of this time the solid product is recovered by filtration. The solid is washed with methanol and then with ether and dried to give 1-(4-cyanocinnamylideneamino)-3-(4-chloro-α-methylbenzylideneamino)-guanidine hydrochloride, M.P. 274–278° C.

EXAMPLE 17

0.17 ml. of concentrated hydrochloric acid is added to a suspension of 450 mg. of 1-amino-3-(4-chloro-α-methylbenzylideneamino)-guanidine in 75 ml. of methanol. The resulting solution is filtered and to the filtrate is added a solution of 420 mg. of 4-methylsulfonylcinnamaldehyde in 50 ml. of methanol. The resulting reaction mixture is stirred for 15 hours at room temperature and then concentrated under vacuum to about three-fourths of its initial volume. The solid product is recovered by filtration, washed with methanol and ether and dried to afford 1 - (4-methylsulfonylcinnamylideneamino)-3-(4-chloro-α-methylbenzylideneamino)-guanidine hydrochloride, M.P. 259–262° C.

EXAMPLE 18

To a suspension of 444 mg. of 1-amino-3-(4-nitrobenzylideneamino)-guanidine in 100 ml. of methanol is added 0.17 ml. of concentrated hydrochloric acid. The resulting solution is treated with a solution of 420 mg. of 4-methylsulfonylcinnamaldehyde in 50 ml. of methanol. The reaction mixture is stirred for 15 hours at room temperature and then concentrated under reduced pressure to about one-third volume. The concentrate is stirred at room temperature for about 6 hours and the resulting solid filtered off. The solid is washed with methanol and ether to give 1-(4-methylsulfonylcinnamylideneamino)-3-(4-nitrobenzylideneamino) - guanidine hydrochloride, M.P. 192–197° C.

The starting materials for the processes of this invention are either themselves known, or are readily prepared by known methods from known compounds. Thus, the 1-amino-3-(substituted benzylideneamino)-guanidines are obtained by the following procedure, utilizing the appropriate nuclearly substituted benzaldehyde in place of 4-chlorobenzaldehyde:

To a mixture of 1,3-diaminoguanidine monohydrochloride (25.0 g. of 90%, 0.18 mole) and sodium carbonate (19.1 g., 0.18 mole) in 250 ml. of warm ethanol-water (2:1) is added a solution of 4-chlorobenzaldehyde (22.6 g., 0.16 mole) in 60 ml. of ethanol over a period of 15 minutes with stirring under nitrogen. The mixture is stirred at reflux for 90 minutes and then cooled in an ice bath. The resulting insolubles are removed by filtration and discarded. The filtrate is diluted with water and extracted with methylene chloride. The methylene chloride solution is filtered through paper and then evaporated under reduced pressure giving 21.6 g. of crude 1-(4-chlorobenzylideneamino)-3-amino guanidine. The product is dissolved in 200 ml. of methanol with warming. The solution is cooled in ice and about 7 ml. of concentrated hydrochloric acid is added dropwise until the solution is just acidic. Several volumes of ethyl ether are added. The hydrochloride salt of the product separates and is collected, rinsed with ethyl ether and dried in a vacuum oven furnishing 1-(4 - chlorobenzylideneamino)-3-amino guanidine hydrochloride, M.P. 239–240° C.

The 1-(nuclearly substituted cinnamylideneamino)-3-amino guanidines which may also be used as starting materials are obtained from the appropriate nuclearly substituted cinnamaldehyde according to the following procedure.

A suspension of 1,3-diamino-guanidine monohydrochloride (5.00 g., of 90%, 36 mmole) in 75 ml. of ethanol-water (2:1) and sodium carbonate (2.10 g., 20 mmole) is heated to reflux and 4-chloro-cinnamaldehyde (5.33 g., 32 mmole) in 70 ml. of ethanol is added dropwise with stirring. The mixture is stirred at reflux for 2.0 hours. After cooling in ice, the solids are filtered and rinsed with a small amount of 50% aqueous ethanol. The filtrate is diluted with 0.6 l. of water, and extracted with ethyl ether. The ether solution is dried over magnesium sulfate and evaporated to dryness under reduced pressure. The residue is slurried with 100 ml. of ether and the insolubles collected furnishing 2.5 g. of 3-amino-1-(4-chlorocinnamylideneamino)-guanidine, M.P. 160° C. The hydrochloride or other acid addition salt is conveniently obtained by cyrstallizing the material from methanolic or ethanolic hydrogen chloride, or from methanol or ethanol containing the desired acid.

Benzaldehydes and alkyl phenyl ketones having the nuclear substituents $R_{11}$, $R_{12}$, and $R_{13}$ (as defined in Formula I) are either known or readily prepared by known methods. The nuclearly substituted cinnamaldehydes (with $R_1$, $R_2$ and $R_3$ substituents as defined in Formula I) are either known or prepared from the corresponding benzylaldehyde by reacting the latter material with acetaldehyde according to the process of Cignarella et al., *J. Med. Chem.* 8, 326, 1965. The alkyl styryl ketones (with $R_1$, $R_2$, $R_3$, $R_4$, and $R_5$ substituents as defined in Formula I are either known or readily prepared by known methods such as condensing the appropriately substituted benzaldehyde with methyl alkyl ketone according to the procedure of H. Gilman, *Org. Syn.*, Coll. vol. I, 77, 1958.

Any departure from the above description which conforms to the present invention is intended to be included within the scope of the claims.

What is claimed is:

1. A compound having the formula:

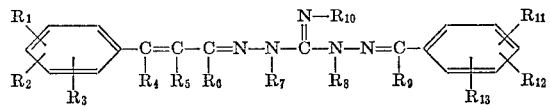

or a salt thereof with a pharmaceutically acceptable acid, where $R_1$ and $R_{11}$ are each hydrogen, halogen, nitro, trifluoromethyl, trifluoromethoxy, trifluoromethylthio, acetyl, carbamoyl, cyano, methylsulfinyl, methylsulfonyl, carbomethoxy or dimethylaminosulfonyl; $R_2$ and $R_{12}$ are each hydrogen, halogen or nitro; and $R_3$ and $R_{13}$ are each hydrogen or halogen, provided that at least one of said substituents is other than hydrogen; $R_4$ and $R_5$ are each hydrogen, halogen or lower alkyl; $R_6$ through $R_9$ are each hydrogen or lower alkyl; and $R_{10}$ is hydrogen, lower alkyl or loweralkanoyl.

2. A compound having the formula:

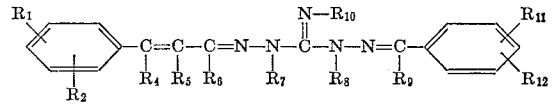

or a salt thereof with a pharmaceutically acceptable acid, where $R_1$ and $R_{11}$ each represent hydrogen, halogen, nitro, trifluoromethyl, trifluoromethoxy, trifluoromethylthio, cyano, methylsulfinyl, methylsulfonyl or carbomethoxy; $R_2$ and $R_{12}$ each represent hydrogen, halogen or nitro, where $R_1$, $R_2$, $R_{11}$ and $R_{12}$ are in the metal and para positions and where at least one is other than hydrogen; $R_4$ and $R_5$ are each hydrogen, halogen or methyl; $R_6$ through $R_9$ are each hydrogen or lower alkyl; and $R_{10}$ is hydrogen, methyl or acetyl.

3. A compound of claim 2 wherein $R_1$ and $R_{11}$ are in the para position, $R_2$ and $R_{12}$ are hydrogen; $R_4$ and $R_5$ are each hydrogen, chlorine or methyl; $R_6$ through $R_9$ are each hydrogen or methyl; and $R_{10}$ is hydrogen.

4. A compound of claim 3 wherein $R_1$ and $R_{11}$ are hydrogen, halogen, nitro, cyano, methylsulfinyl or trifluoromethyl and at least one is other than hydrogen; $R_4$, $R_5$, $R_7$ and $R_8$ are hydrogen; and $R_6$ and $R_9$ are each hydrogen or methyl.

5. A compound of claim 4 where $R_1$ and $R_{11}$ are chloro.

6. The compound of claim 5 which is 1-(4-chlorocinnamylideneamino) - 3 - (4 - chlorobenzylideneamino)-guanidine hydrochloride.

References Cited

UNITED STATES PATENTS 3,383,409     5/1968     Bream et al. _____ 260—564 F X LEON ZITVER, Primary Examiner G. A. SCHWARTZ, Assistant Examiner U.S. Cl. X.R.

260—397.7, 465 D, 465 E, 470, 471 A, 501.14, 556 AR, 556 B, 556 S, 558 R, 558 S, 558 A, 559 T, 559 A, 561 R, 561 S; 424—304, 309, 316, 320, 321, 324, 326